United States Patent
Kamada et al.

(10) Patent No.: US 9,515,730 B2
(45) Date of Patent: Dec. 6, 2016

(54) VISIBLE LIGHT COMMUNICATION TERMINAL

(71) Applicant: Panasonic Intellectual Property Management Co., Ltd., Osaka (JP)

(72) Inventors: Masao Kamada, Osaka (JP); Yosuke Kondo, Osaka (JP); Toyohiro Maruyama, Saitama (JP); Takashi Osugi, Osaka (JP); Yukiko Omoto, Hyogo (JP); Yoshiyuki Miyake, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/439,203

(22) PCT Filed: Oct. 22, 2013

(86) PCT No.: PCT/JP2013/006244
§ 371 (c)(1),
(2) Date: Apr. 28, 2015

(87) PCT Pub. No.: WO2014/068901
PCT Pub. Date: May 8, 2014

(65) Prior Publication Data
US 2015/0295645 A1    Oct. 15, 2015

(30) Foreign Application Priority Data
Nov. 5, 2012 (JP) .................. 2012-243284

(51) Int. Cl.
*H04B 10/00* (2013.01)
*H04B 10/116* (2013.01)
(Continued)

(52) U.S. Cl.
CPC ............. *H04B 10/116* (2013.01); *H04B 10/60* (2013.01); *H04R 1/1016* (2013.01); *H04R 1/028* (2013.01); *H04R 1/1041* (2013.01)

(58) Field of Classification Search
CPC ..... H04B 10/116; H04B 10/60; H04B 10/112; H04B 10/114; H04B 10/1141; H04B 10/1149; H04B 10/1143; H04M 1/05
(Continued)

(56) References Cited

U.S. PATENT DOCUMENTS 7,046,799 B2 * 5/2006 Ma .......................... H04M 1/05
379/430
7,539,525 B2 * 5/2009 Kim ....................... H04M 1/05
379/433.13

(Continued)

FOREIGN PATENT DOCUMENTS

GB    2 279 195 A    12/1994
JP    04-319841 A    11/1992
(Continued)

OTHER PUBLICATIONS

International Search Report for corresponding International Application No. PCT/JP2013/006244 mailed Dec. 10, 2013.
(Continued)

*Primary Examiner* — Hanh Phan
(74) *Attorney, Agent, or Firm* — Renner, Otto, Boisselle & Sklar, LLP

(57) ABSTRACT

A housing body of a visible light communication terminal houses a light receiving unit configured to receive a visible light communication signal to convert the received visible signal to an electrical signal, an output unit configured to output information obtained from the visible light communication signal, and a power supply unit configured to supply power to the light receiving unit and the output unit. An ear hooking part is curved in an arc-like shape and is attached at one end thereof to the housing body, and is configured to (Continued)

fit the housing body to an auricle by being hooked onto the auricle and together with the housing body sandwiching the auricle therebetween. The light receiving unit is located on a portion of the housing body on an upper side thereof in a vertical direction in a state where the housing body is fitted to the auricle.

12 Claims, 5 Drawing Sheets

(51) Int. Cl.
*H04R 1/10* (2006.01)
*H04B 10/60* (2013.01)
*H04R 1/02* (2006.01)

(58) Field of Classification Search
USPC ............... 398/118, 172, 128, 130, 127, 202, 208,398/135, 136, 119, 140; 455/575.2, 575.1, 455/575.3, 575.4; 381/381, 156, 379, 330; 379/433.13, 430
See application file for complete search history.

(56) References Cited

U.S. PATENT DOCUMENTS 7,925,037 B2* 4/2011 Te Riet ................ H04M 1/05
381/330
2009/0171571 A1* 7/2009 Son ..................... G01C 21/20
701/532

FOREIGN PATENT DOCUMENTS

| JP | H06-132902 A | 5/1994 |
| JP | H07-79493 A | 3/1995 |
| JP | 3079678 U | 6/2001 |
| JP | 2008-206087 A | 9/2008 |
| JP | 3159833 U | 5/2010 |
| JP | 2011-114512 A | 6/2011 |

OTHER PUBLICATIONS

Form PCT/ISA/237 for corresponding International Application No. PCT/JP2013/006244 dated Dec. 10, 2013.

* cited by examiner

VISIBLE LIGHT COMMUNICATION TERMINAL

TECHNICAL FIELD

The present invention relates to a visible light communication terminal.

BACKGROUND ART

Conventionally, a visible light communication system in which data transmission is performed using visible light has been proposed (refer to JP 2008-206087A, for example). The communication system is constituted by a lighting fixture and a receiver. The lighting fixture is configured to radiate illumination light on which modulated light is superimposed by modulating current flowing through a light emitting diode according to a communication signal. The receiver is configured to receive the illumination light and analyze the received light to obtain the communication signal.

The lighting fixture of the visible light communication system described above is generally installed at a high place such as a ceiling. Thus, if a user holds the receiver in his/her hand for use, the receiver may possibly fail to receive the communication signal due to the illumination light being blocked by the body of the user. Also, there was a problem in that, in the case where the receiver is held by hand for use, other tasks are hampered due to the hand that holds the receiver being occupied.

SUMMARY OF INVENTION

The present invention has been made in view of the above-described problems, and an object of the present invention is to provide a visible light communication terminal that can be used without being held by hand, and can reliably receive light that is irradiated from above.

In order to solve the above-described problems, the visible light communication terminal according to the present invention includes a light receiving unit (11), an output unit (13, 14, 15), a power supply unit (19), a housing body (20), and an ear hooking part (26 (27)). The light receiving unit (11) includes a light receiving element (11a) configured to receive a visible light communication signal that is outputted from an external visible light transmitter, and is configured to convert the visible light communication signal to an electrical signal by the light receiving element (11a), and output the electrical signal. The output unit (13, 14, 15) is configured to output information obtained from the visible light communication signal that is converted to the electrical signal by the light receiving unit (11). The power supply unit (19) includes a battery (19a), and is configured to supply electric power to the light receiving unit (11) and the output unit (13, 14, 15). The housing body (20) houses at least the light receiving unit (11), the output unit (13, 14, 15), and the power supply unit (19). The ear hooking part (26 (27)) is curved in an arc-like shape and attached at one end (261 (271)) thereof to the housing body (20), and is configured to fit the housing body (20) to an auricle of a user by being hooked onto the auricle and together with the housing body (20) sandwiching the auricle therebetween. The light receiving unit (11) is located on a portion of the housing body (20) on an upper side thereof in a vertical direction in a state where the housing body (20) is fitted to the auricle.

It is preferable that, in the visible light communication terminal, components that are housed in the housing body (20) are arranged such that a center of gravity of the visible light communication terminal is located vertically lower than a position of the one end with which the ear hooking part (26 (27)) is attached to the housing body (20), in the state where the housing body (20) is fitted to the auricle.

It is preferable that, in the visible light communication terminal, the output unit includes a loudspeaker (14) configured to convert a sound signal generated based on the information into sound, and output the sound. The loudspeaker (14) is located vertically lower than the position of the one end with which the ear hooking part (26 (27)) is attached to the housing body (20), in the state where the housing body (20) is fitted to the auricle of the user.

It is preferable that, in the visible light communication terminal, a first projecting part (21) projecting toward the auricle in the state where the housing body (20) is fitted to the auricle of the user is provided on a portion of the housing body (20) where the loudspeaker (14) is housed, and the loudspeaker (14) is housed inside the first projecting part (21).

It is preferable that, in the visible light communication terminal, a second projecting part (22) is provided on a portion of the housing body (20) on the upper side of the housing body (20) in the vertical direction, so as to project toward the head of the user in the state where the housing body (20) is fitted to the auricle of the user, the portion being on an opposite side of the position of the one end with which the ear hooking part (26 (27)) is attached to the housing body (20) from the loudspeaker (14).

It is preferable that, in the visible light communication terminal, the housing body (20) is provided, on left and right sides relative to a portion thereof that opposes an ear canal in the state where the housing body (20) is fitted to the auricle of the user, with attachment parts (251, 252) to which the one end (261, 271) of the ear hooking part (26, 27) is detachably attached. A direction in which the ear hooking part (26, 27)) is hooked onto the auricle is reversed depending on whether the ear hooking part (26) is attached to the attachment part (251) on the left or the ear hooking part (27) is attached to the attachment part (252) on the right, and the ear hooking part (26 (27)) is attached to one of the attachment part (251) on the right and the attachment part (252) on the left. Here, the right-left direction is a direction corresponding to a front and rear direction relative to a head of a user when the housing body (20) is fitted to the auricle of the user.

It is preferable that, in the visible light communication terminal, an expandable and retractable pole (28) configured to be adjustable in a projecting direction from the housing body (20) is provided on a portion of the housing body (20) on the upper side thereof in the vertical direction in the state where the housing body (20) is fitted to the auricle, and the light receiving unit (11) is arranged at a tip of the pole (28).

Note that a configuration that involves "fitting the housing body (20) to an auricle of a user by the ear hooking part (26 (27)) being hooked onto the auricle and together with the housing body (20) sandwiching the auricle therebetween", and a configuration in which "the light receiving unit (11) is located on a portion of the housing body (20) on an upper side thereof in a vertical direction in a state where the housing body (20) is fitted to the auricle of the user" are optional.

It is preferable that, in the visible light communication terminal, in place of the above optional configurations, the housing body (20) has a first surface (201) and a second surface (202) on different sides in a thickness direction (D1); the ear hooking part (26 (27)) is attached to the housing body

(20) such that a predetermined gap for sandwiching the auricle of the user is formed between the ear hooking part (26 (27)) and the first surface (201); the housing body (20) includes a base part (20a) to which the ear hooking part (26 (27)) is attached and an extension part (20b) extending from the base part (20a), on a first side and a second side in a longitudinal direction (D2) that is orthogonal to the thickness direction (D1), respectively; the ear hooking part (26 (27)) is attached to the base part (20a) so as to project convexly in the longitudinal direction (D2) from the base part (20a) side toward the extension part (20b) side; and the light receiving element (11a) of the light receiving unit (11) is arranged on the extension part (20b) of the housing body (20).

It is preferable that components that are housed in the housing body (20) are arranged such that a center of gravity of the visible light communication terminal is located inside the base part (20).

It is preferable that the output unit includes a loudspeaker (14) configured to convert a sound signal generated based on the information to sound, and output the sound. The loudspeaker (14) is located inside the housing body (20) such that at least a portion of the ear hooking part (26 (27)) is located between the loudspeaker (14) and the light receiving unit (11) in the longitudinal direction (D2).

It is preferable that a first projecting part (21) is provided on the housing body (20) on the base part (20a) side thereof in the longitudinal direction (D1) to project in the thickness direction (D1), and the loudspeaker (14) is housed inside the first projecting part (21).

It is preferable that a second projecting part (22) is provided on the housing body (20) on the extension part side (20b) thereof in the longitudinal direction (D2) to project in a same direction as the projecting direction of the first projecting part (21).

It is preferable that one of an ear hooking part (26) for fitting to right ear and an ear hooking part (27) for fitting to left ear is selected as the ear hooking part. The housing body (20) is provided, on the first surface (201) thereof, with a first attachment part (251) to which one end (261) of the ear hooking part (26) for fitting to right ear is detachably attached, and a second attachment part (252) to which one end (271) of the ear hooking part (27) for fitting to left ear is detachably attached.

It is preferable that, on the extension part (20b) of the housing body (20), an expandable and retractable pole (28) configured to be adjustable in a projecting direction from the housing body (20) is provided, and the light receiving element (11a) of the light receiving unit (11) is arranged at a tip of the pole (28).

According to the present invention, since the housing body of the visible light communication terminal is fitted to an ear by the ear hooking part being hooked onto an auricle, the visible light communication terminal can be used without being held by a hand. Moreover, since the light receiving unit is located on a portion of the housing body on an upper side thereof in a vertical direction in a state where the housing body is fitted to the auricle, light that is irradiated from above can be reliably received.

DESCRIPTION OF EMBODIMENTS

A visible light communication terminal according to the present invention is used for receiving visible light that is transmitted from a visible light transmitter (lighting fixture having a visible light communication function, for example) configured to transmit a communication signal (visible light communication signal) with visible light, and acquiring the visible light communication signal from the received light.

Figure 4:
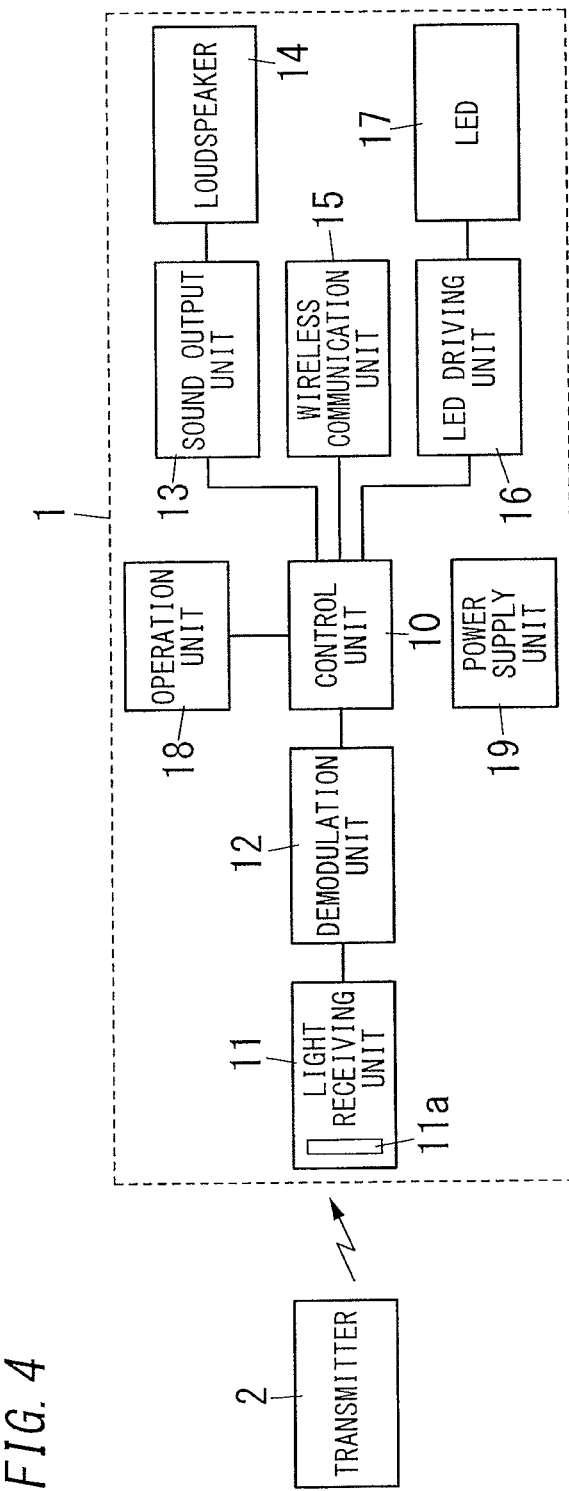
FIG. 4 is a block diagram of the visible light communication terminal according to the present embodiment.

FIG. 4 is a block diagram of a visible light communication terminal 1. The visible light communication terminal 1 includes a control unit 10, a light receiving unit 11, a demodulation unit 12, a sound output unit 13, a loudspeaker 14, a wireless communication unit 15, an LED driving unit 16, an LED 17, an operation unit 18, and a power supply unit 19.

The control unit 10 includes a microcomputer, for example, and is configured to perform overall control.

The light receiving unit 11 includes a light receiving element (photodiode) 11a and peripheral circuits thereof, and is configured to receive visible light radiated from a transmitter 2 (visible light transmitter), and convert the received visible light to an electrical signal.

The demodulation unit 12 is configured to demodulate a signal inputted from the light receiving unit 11, and output an obtained visible light communication signal to the control unit 10.

The sound output unit 13 is configured to amplify a sound signal inputted from the control unit 10, and drive the loudspeaker 14.

The wireless communication unit 15 is configured to communicate with an external communication device (not shown) using the Bluetooth (registered trademark) short-range wireless communication technology, for example, under the control of the control unit 10.

The LED driving unit 16 is configured to light, extinguish, or flash the LED 17 according to a control signal supplied from the control unit 10. Note that the LED 17 is housed inside a later-described housing body 20, and emitted light from the LED 17 can be seen from the outside through the housing body 20 (may be translucent). In the present embodiment, a light emitting portion of the LED 17 is provided above the power switch 18a and below a later-described volume adjustment switch 18c (i.e., at a position between the power switch 18a and the volume adjustment switch 18c) such that the emitted light from the LED 17 can be easily seen when a later-described power switch 18a is operated.

The operation unit 18 includes the power switch 18a and the volume adjustment switches 18b and 18c, which are arranged on a surface of the housing body 20 (described later), and is configured to output, upon being operated by a user, a signal according to the operation to the control unit 10.

The power supply unit 19 is configured to supply power necessary for operation to the units of the visible light communication terminal 1 using a battery 19a as a power supply.

When the power switch 18a is operated by the user for powering on, and the power supply unit 19 supplies operating power to the units, the control unit 10 starts operation, and the light receiving unit 11 enters a state of waiting to receive a signal. When the transmitter 2 transmits visible light (visible light on which a communication signal is superimposed) and the light receiving unit 11 receives the visible light, in this state, the light is converted to an electrical signal by the light receiving unit 11, the electrical signal is demodulated by the demodulation unit 12, and the demodulated signal is inputted to the control unit 10.

The control unit 10, upon receiving a visible light communication signal including location information from the transmitter 2, for example, causes the wireless communication unit 15 to wirelessly transmit the location information to an external communication device (server). The external communication device returns, to the visible light communication terminal 1 as a wireless signal, information (information relating to an exhibit in the case of a museum or the like, for example; location guidance in the case of a public walkway, for example) corresponding to the location information from the wireless communication unit 15. The control unit 10 outputs a sound signal to the sound output unit 13 based on the signal received from the external communication device via the wireless communication unit 15, and causes the loudspeaker 14 to output the sound signal as sound. Accordingly, a description of an exhibit and location guidance can be performed by sound based on the location information received from the transmitter 2, for example. Note that the visible light communication terminal 1 itself may generate a sound signal based on location information included in the visible light communication signal, and output the generated signal to the outside as sound via the loudspeaker 14. For example, the visible light communication terminal 1 may include a storage unit (not shown) storing a table in which location information and sound information are associated, and the control unit 10 may output a sound signal based on the table.

Also, the control unit 10 transmits a control signal to the LED driving unit 16 for causing the LED 17 to flash while a demodulated signal is inputted from the demodulation unit 12 (that is, while the light receiving unit 11 receives visible light), in order to display that visible light radiated from the transmitter 2 is being received. Note that, upon the volume adjustment switch 18b being operated by the user, the control unit 10 outputs a control signal for increasing sound volume to the sound output unit 13 to increase the sound volume. Also, upon the volume adjustment switch 18c being operated by the user, the control unit 10 outputs a control signal for decreasing sound volume to the sound output unit 13 to decrease the sound volume.

Next, the structure of the visible light communication terminal 1 will be described based on FIGS. 1 to 3.

The visible light communication terminal 1 is made of a synthetic resin molded article and includes a housing body 20 that houses a circuit shown in the block diagram in FIG. 4. An ear hooking part (ear hanger) 26 (27) for fitting the housing body 20 to an ear of the user is attached to the housing body 20.

The housing body 20 has a first surface 201, on a first side in a thickness direction D1, as a surface opposing the head of the user in a state where the visible light communication terminal 1 is fitted to an ear of the user. The ear hooking part 26 (27) is attached to the housing body 20 on the first surface 201 side. That is, the housing body 20 has the first surface 201 as a surface of the side on which the ear hooking part 26 (27) is attached. Also, the housing body 20 has a second surface 202, on a second side in the thickness direction D1, on which the operation unit 18 is provided. Accordingly, the housing body 20 includes the first surface 201 and the second surface 202 on the first side and the second side, respectively, in the thickness direction D1. The first side in the thickness direction D1 corresponds to the head side of the user when the visible light communication terminal 1 is fitted to the ear of the user.

Figure 2A:
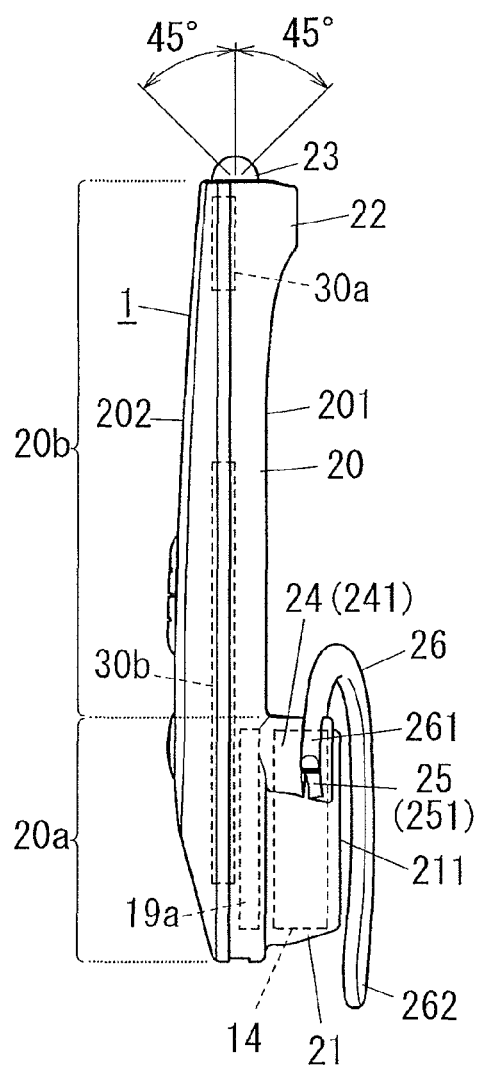
FIGS. 2A and 2B are respectively a right-side view and a rear view of the visible light communication terminal according to the present embodiment.
Figure 3:
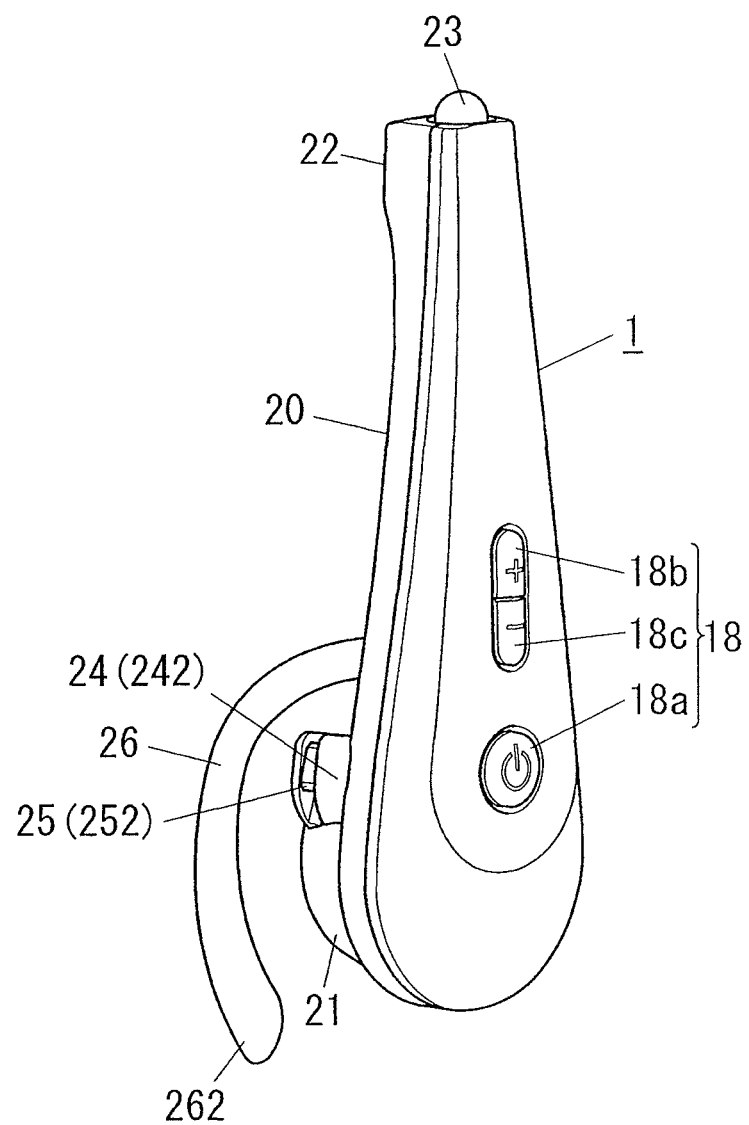
FIG. 3 is a perspective view of the visible light communication terminal according to the present embodiment.

Also, the housing body 20 includes a base part 20a and an extension part 20b extending from the base part 20a on a first side and a second side, respectively, in a longitudinal direction D2 that is orthogonal to the thickness direction D1 (refer to FIG. 2A). The extension part 20b extends (from the first side toward the second side in the longitudinal direction D2) from the base part 20a. Also, the housing body 20 has a first end 203 and a second end 204 at an end on the first side and an end on the second side, respectively, in the longitudinal direction D2. The ear hooking part 26 (27) is attached to the base part 20a, and the light receiving unit 11 is located at the extension part 20b. The second side in the longitudinal direction D2 corresponds to the upper side in the vertical direction when the visible light communication terminal 1 is fitted to an ear.

Hereinafter, the thickness direction D1 is also referred to as a right-left direction. Also, a part on the first side and a part on the second side of the housing body 20 in the longitudinal direction D2 are also referred to as an upper part and a lower part, respectively.

The shape of the housing body 20 when viewed in the right-left direction (the shape shown in FIG. 1A) is formed as a shape in which a semicircular portion is connected below a trapezoidal portion that widens toward the lower side.

Figure 1C:
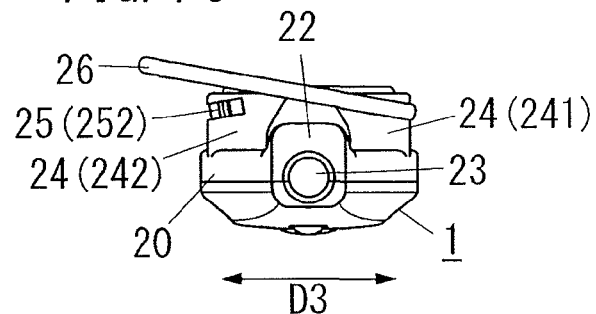
FIG. 1 shows a visible light communication terminal according to the present embodiment, FIG. 1A being a front view thereof, FIG. 1B being a left-side view thereof, FIG. 1C being a top view thereof, FIG. 1D being a bottom view thereof.
Figure 1B:
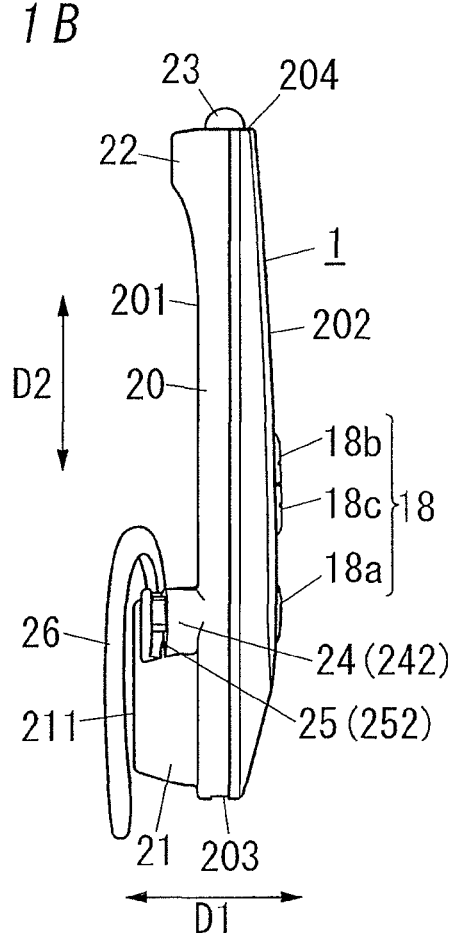
Figure 1D:
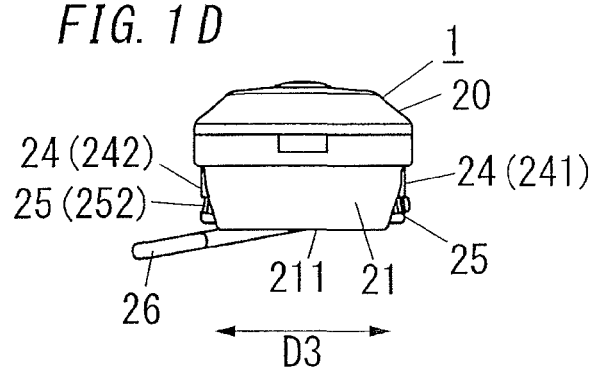
Figure 2B:
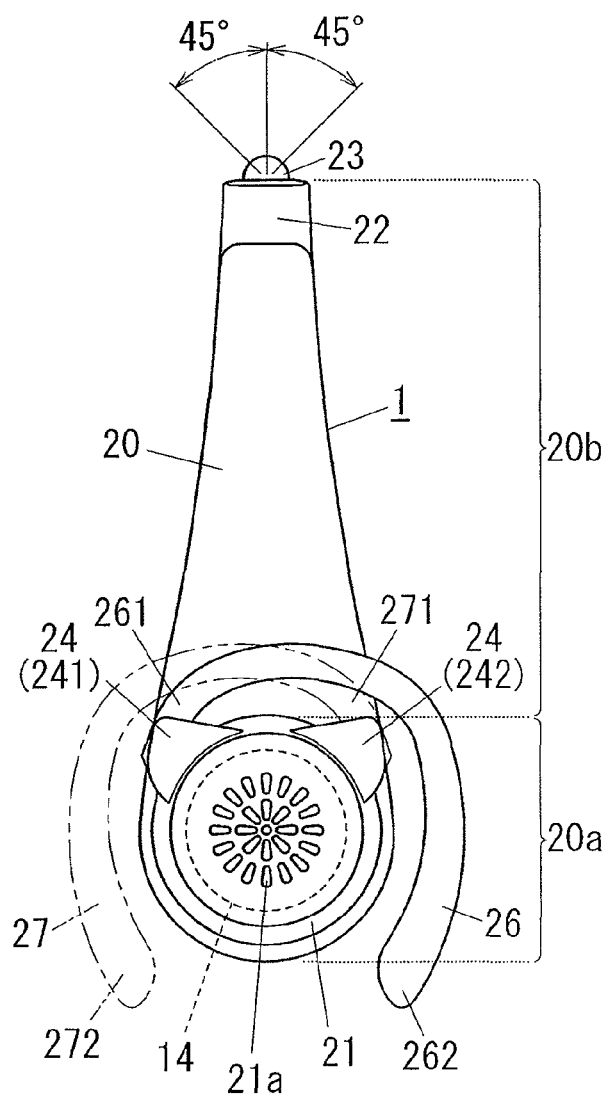

A first projecting part 21 shaped like a circular truncated cone is provided on the first surface 201 (surface of the housing body 20 opposing the head of the user in a state where the housing body 20 is fitted to the ear of the user) of the housing body 20 at the lower part of the housing body 20 so as to project toward the head (toward the first side in the thickness direction D1). The first projecting part 21 is provided on the base part 20a. The first projecting part 21 is formed so as to have a smaller diameter toward the first side in the thickness direction D1, as shown in FIGS. 1B and 1D. A plurality of through holes 21a are formed in an end surface 211 of the first projecting part 21. The through holes 21a radially extend from a center of the end surface 211 of the first projecting part 21, as shown in FIG. 2B. The loudspeaker 14 is housed inside the first projecting part 21, and the sound that is outputted from the loudspeaker 14 is outputted outside the housing body 20 via the through holes 21a.

Also, a second projecting part 22 is provided on the upper part of the housing body 20 on the first surface 201 of the housing body 20 so as to project (relative to an intermediate part of the housing body 20 in the vertical direction) toward the head side (toward the first side in the thickness direction D1), as shown in FIGS. 1B and 2A. That is to say, the housing body 20 is provided with the first projecting part 21 and the second projecting part 22, which project toward the first side in the thickness direction D1, on the first side and the second side, respectively, in the longitudinal direction D2. A hemispherical lens 23 that concentrates visible light that is radiated from the transmitter 2 to the light receiving unit 11 is attached to the upper part (specifically, the second end 204 of the housing body 20) of the housing body 20. The light receiving unit 11 is housed in the upper part of the housing body 20 such that a light receiving face of the light receiving element 11a is located at or near the focal point of the lens 23.

Here, the upper part of the housing body 20 is formed to have a smaller width compared with the lower part thereof, and a printed wiring board 30a on which only the light receiving unit 11 and peripheral circuits thereof (may include demodulation unit 12) are mounted is housed in the upper part of the housing body 20 (refer to FIG. 2A). Also, the circuits shown in the block diagram in FIG. 4, other than the light receiving unit 11 and the peripheral circuits thereof, are mounted on another printed wiring board 30b, and the printed wiring board 30b is housed in the lower part, of the housing body 20, having a large width (refer to FIG. 2A). The two printed wiring boards 30a and 30b are housed separately in the upper part and the lower part, and are electrically connected via a plurality of cables (not shown), inside the housing body 20.

The ear hooking part 26 (27) made of a resin mold is attached to the housing body 20. The ear hooking part 26 (27) has a plate-like shape with a small width, and is formed in an arc-like curved shape so as to depict an approximate semicircle, and has a first end 261 (271) and a second end 262 (272) at different ends thereof. Protrusions 24 (241) and 24 (242), each of which is shaped like a trapezoid, are provided at left and right ends of an upper part in FIG. 2B, respectively, on an outer circumference surface of the first projecting part 21, so as to project in the radial direction of the first projecting part 21. Grooves 25 (251) and 25 (252), into each of which the one end 261 (271) of the ear hooking part 26 (27) is detachably inserted, are provided in the left and right protrusions 24 (241) and 24 (242), respectively. That is to say, the grooves 25 (attachment parts), into each of which the one end 261 (271) of the ear hooking part 26 (27) is inserted and connected, are respectively provided on different sides, relative to a position opposing an ear canal of the ear of the user (central position of the first projecting part 21), of the first projecting part 21 in a front-rear direction (width direction D3 that is orthogonal to the thickness direction D1 and the longitudinal direction D2; right-left direction in FIG. 2B). The ear hooking part 26 (27) is attached to one of the right groove 251 and the left groove 252 in FIG. 2B.

Figure 1A:
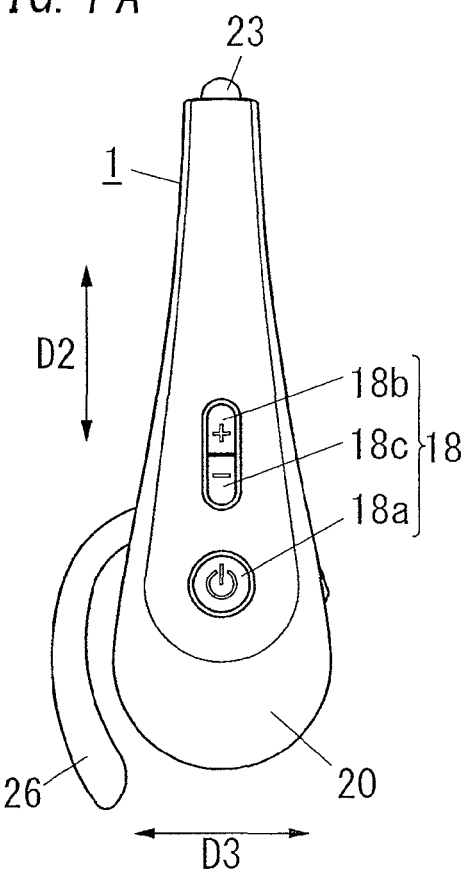

The visible light communication terminal 1 of the present embodiment is used in a state of being fitted to the right ear of the user, and the right side in FIG. 1A corresponds to the front side of a body of the user, and therefore the one end 261 of the ear hooking part 26 for fitting to right ear is inserted and connected to the front side (left in FIG. 2B) groove (first attachment part) 251. The ear hooking part 26 projects rearward (rightward in FIG. 2B) from a portion connected to the groove 251, and curves along the outer circumference surface of the first projecting part 21, and the end portion (second end) 262 thereof projects downward in FIG. 2B. The ear hooking part 26 curves so as to cover half of the base part 20a on an obliquely upper side (refer to FIG. 2B). Also, in a direction shown in FIG. 2A, the end portion 262 of the ear hooking part 26 is located on a right side (first side in the thickness direction D1; head side) relative to a right side end surface (end surface 211) of the first projecting part 21. The end portion 262 of the ear hooking part 26 is movable at least in the right-left direction (thickness direction D1). When the ear hooking part 26 is expanded in a direction of the end portion 262 moving away from the end surface 211 of the first projecting part 21, a force is generated for pressing the end portion 262 of the ear hooking part 26 toward the first projecting part 21 due to elasticity of the ear hooking part 26.

When the visible light communication terminal 1 is fitted to the ear of the user, after inserting the end portion 262 of the ear hooking part 26 between the auricle and the head of the user while expanding the ear hooking part 26 in a direction of the end portion 262 moving away from the end surface 211 of the first projecting part 21, the end portion 262 of the ear hooking part 26 is passed around the rear side of the auricle and hooked onto the ear. At this time, since the end portion 262 of the ear hooking part 26 is pressed toward the first projecting part 21 due to the elastic restoration force of the ear hooking part 26 itself, the auricle is sandwiched between the ear hooking part 26 and the housing body 20, and accordingly the visible light communication terminal 1 is fitted to the ear. Note that the visible light communication terminal 1 is firmly fitted to the ear as a result of almost all of the ear hooking part 26 abutting the back side of the auricle.

Incidentally, although, in the above embodiment, a case where the visible light communication terminal 1 is fitted to the right ear of the user is described as an example, the visible light communication terminal 1 can be fitted to the left ear. In this case, an ear hooking part 27 for fitting to left ear (refer to a dotted line in FIG. 2B) having a shape which is mirror symmetrical to the ear hooking part 26 for fitting to right ear is used. That is to say, in the case where the visible light communication terminal 1 is fitted to the left ear of the user, since the left side in FIG. 1A corresponds to the front side of the body of the user, the one end 271 of the ear hooking part 27 for fitting to left ear is inserted and connected to the groove (second attachment part) 252 on the front side (right side in FIG. 2B) of the body of the user. The ear hooking part 27 for fitting to left ear is formed to have a symmetrical shape in the right-left direction with the ear hooking part 26 for fitting to right ear, and is used by being inserted into the groove 252 on the right side in FIG. 2B. The ear hooking part 27 for fitting to left ear projects to the left side in FIG. 2B from a portion connected to the groove 252, and curves along the outer circumference surface of the first projecting part 21, and the end portion (second end) 272 thereof projects downward in FIG. 2B. The ear hooking part 27 curves so as to cover half of the base part 20a on an obliquely upper side. Also, the ear hooking part 27 for fitting to left ear is also located to the head side (first side in the thickness direction D1) relative to the end surface 211 of the first projecting part 21, similarly to the ear hooking part 26 for fitting to right ear. The end portion 272 of the ear hooking part 27 is movable at least in the right-left direction. When the ear hooking part 27 is expanded in a direction of the end portion 272 moving away from the end surface 211 of the first projecting part 21, a force pressing the end portion 272 of the ear hooking part 27 toward the first projecting part 21 is generated due to elasticity of the ear hooking part 27.

Also, in the visible light communication terminal 1 of the present embodiment, the lens 23 for collecting light to the light receiving unit 11 is attached to the upper part (specifically, the second end 204 of the housing body 20) of the housing body 20. Accordingly, in the state where the visible light communication terminal 1 is fitted to the ear of the user, the lens 23 that is attached to the upper part of the housing body 20 is located at approximately the same height as a top portion of the head of the user, the lens 23 is unlikely to be shaded by the head, hair, or the like. Therefore, light that is irradiated from the transmitter 2 installed at a high place such as a ceiling reliably enters the lens 23, and is received by the light receiving unit 11 via the lens 23. Note that, in the present embodiment, the length (length resulting from adding the lengths of the base part 20a and the extension part 20b: length between the first end 203 and the second end 204) of the housing body 20 in the vertical direction is set to 120 mm, and the length from the central position of the first projecting part 21 to the upper end of the lens 23 is set to 100 mm, such that light in an angle range of ±45 degrees relative to the optical axis center can be received in the state where the visible light communication terminal 1 is fitted to the ear of the user, considering the standard physical constitution of an adult male. These dimensions, however, can be changed appropriately. Also, in the present embodiment, the size of the extension part 20b is set to approximately 2.5 times of the size of the base part 20a in the longitudinal direction D2. The size ratio, however, can be changed appropriately. Note that the size of the extension part 20b is preferably larger than the size of the base part 20a in the longitudinal direction D2.

Also, in the state where the visible light communication terminal 1 is fitted to the ear of the user, the center of the first projecting part 21 is located near the ear canal, and the loudspeaker 14 is located at a position opposing the ear canal. As a result of which, the sound outputted from the loudspeaker 14 is easy heard.

Also, as shown in FIG. 2A, the loudspeaker 14 and the battery 19a of the power supply unit 19 that are relatively heavy, among the components housed inside the housing body 20, are situated in the lower part (a side away from the light receiving unit 11 in the longitudinal direction D2) of the housing body 20. Accordingly, in the state where the housing body 20 is fitted to the ear of the user, the center of gravity of the visible light communication terminal 1 is located vertically lower than the position of the one end (connection position between the ear hooking part 26 and the housing body 20) with which the ear hooking part 26 is attached to the housing body 20. Since the center of gravity of the visible light communication terminal 1 is located below the contact position between the ear hooking part 26 and the auricle of the user in the vertical direction, the lower part of the housing body 20 is unlikely to wobble about, and as a result the position of the housing body 20 is stabilized. Note that the loudspeaker 14, the battery 19a, and the printed wiring board 30b are and are housed inside the housing body 20 so as to be arranged in the stated order from the head side of the user (i.e., arranged in the stated order from the first side to the second side in the thickness direction D1) in the right-left direction (thickness direction D1). That is to say, there is an effect that, since the battery 19a that is heavier than the printed wiring board 30b is located on the head side relative to the printed wiring board 30b, the center of gravity is positioned on the inner side (head side), and the position of the housing body 20 is stabilized, when the housing body 20 is fitted to the ear.

Also, the second projecting part 22 is provided on a portion of the housing body 20 on the upper side of the housing body 20 in the vertical direction, so as to project toward the head of the user in the state where the housing body 20 is fitted to the auricle of the user, the portion being on an opposite side of the position of the one end with which the ear hooking part 26 is attached to the housing body 20 from the loudspeaker 14. Since the second projecting part 22 projecting toward the head is provided on the upper part of the housing body 20, as described above, the light receiving unit 11 or the like can be housed in the second projecting part 22. Also, by reducing the thickness of the portion of the housing body 20 between the first projecting part 21 and the second projecting part 22, the housing body 20 is unlikely to abut against the head when the housing body 20 is fitted to the ear, and the housing body 20 can be fitted to the ear while avoiding hair and the like.

Figure 5:
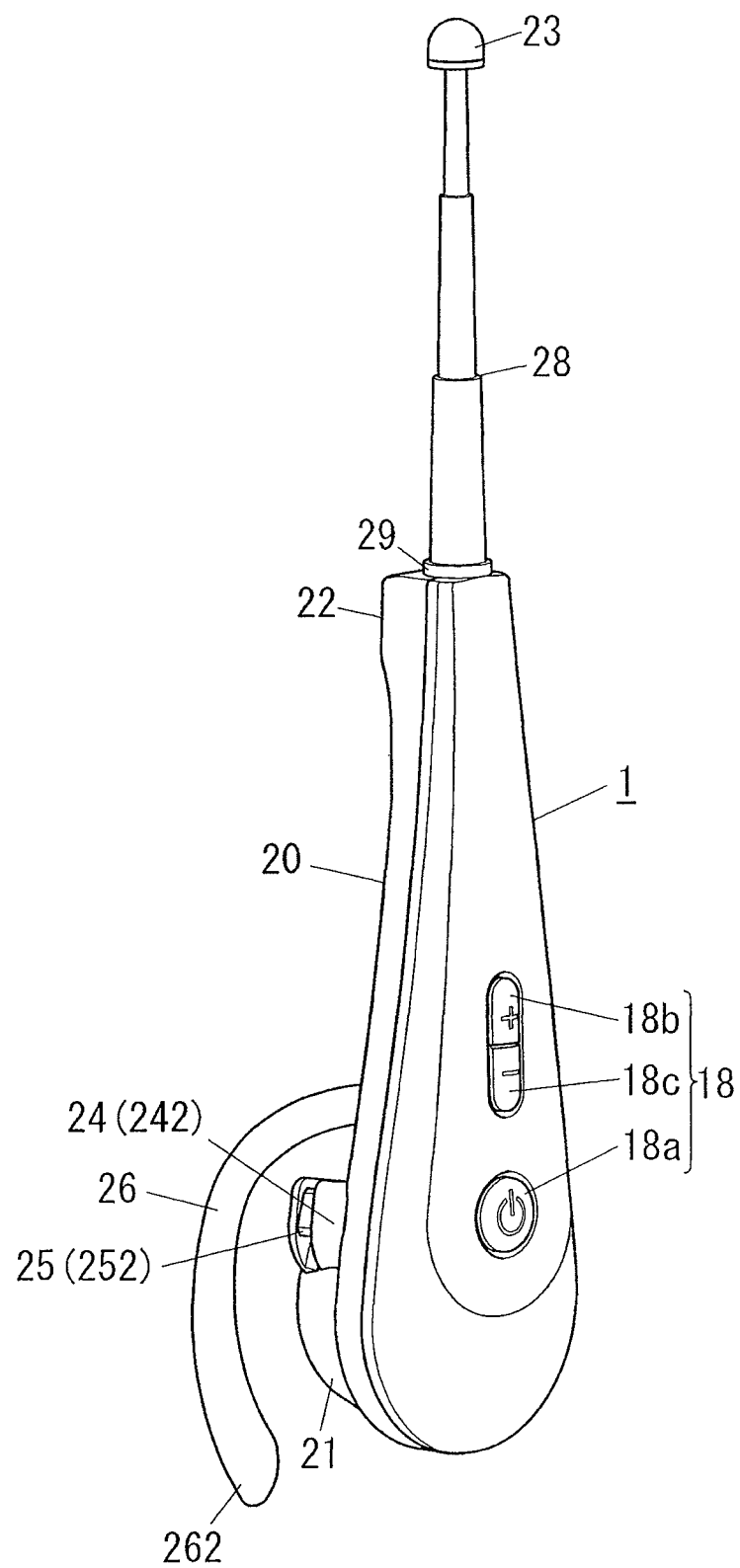
FIG. 5 is a perspective view illustrating a modification of the present embodiment.

Also, although, in the present embodiment, the lens 23 is fixed to the upper part (second end 204 of the housing body 20) of the housing body 20, an expandable and retractable pole 28 may be provided in the upper part (second end 204 of the housing body 20) of the housing body 20, and the lens 23 and the light receiving element 11a of the light receiving unit 11 may be attached to the tip of the pole 28, as shown in FIG. 5. The pole 28 is supported rotatably relative to the housing body 20 by a ball joint 29, for example, and light from a desired direction can be received at a desired position by adjusting the direction and the length of the pole 28.

As described above, the visible light communication terminal 1 of the present embodiment includes the light receiving unit 11, the output unit (the sound output unit 13 and the loudspeaker 14, and optionally the wireless communication unit 15), the power supply unit 19 (battery 19a), the housing body 20, and the ear hooking part 26 (27). The light receiving unit 11 is configured to receive a visible light communication signal outputted from an external transmitter 2 (visible light transmitter), and convert the received signal to an electrical signal. The output unit is configured to output the information obtained from the visible light communication signal that is converted to the electrical signal by the light receiving unit 11 to the outside. The power supply unit 19 is configured to supply electric power to the light receiving unit 11 and the output unit. The housing body 20 houses the light receiving unit 11, the output unit, and the power supply unit 19. The ear hooking part 26 (27) curves in an arc-like shape and is attached at the one end 261 (271) thereof to the housing body 20, and is configured to fit the housing body 20 to the auricle of the ear by being hooked onto the auricle and together with the housing body 20 sandwiching the auricle therebetween. The light receiving unit 11 is located in a portion on the upper side of the housing body 20 in the vertical direction in the state where the housing body 20 is fitted to the auricle.

That is to say, the housing body 20 has the first surface 201 and the second surface 202 on different sides thereof in the thickness direction D1. The ear hooking part 26 (27) is attached to the housing body 20 such that a predetermined gap for sandwiching the auricle is formed between the ear hooking part 26 (27) and the first surface 201. The housing body 20 includes, on the first side and the second side thereof in the longitudinal direction D2 that is orthogonal to the thickness direction D1, the base part 20a to which the ear hooking part 26 (27) is attached and the extension part 20b extending from the base part 20a. The ear hooking part 26 (27) is attached to the base part 20a so as to project convexly in the longitudinal direction D2 from the base part 20a side toward the extension part 20b side. The light receiving unit 11 is located in the extension part 20b of the housing body 20.

That is to say, the housing body 20 has the first surface 201 and the second surface 202 on different sides thereof in the thickness direction D1. The ear hooking part 26 (27) is attached to the housing body 20 so as to form a predetermined gap for sandwiching the auricle between the ear hooking part 26 (27) and the first surface 201. The housing body 20 has the first end 203 and the second end 204 on different ends thereof in the longitudinal direction D2 that is orthogonal to the thickness direction D1. The ear hooking part 26 (27) is attached to the housing body 20 so as to project convexly in the longitudinal direction D2 from the first end 203 side toward the second end 204 side. The light receiving unit 11 is located in a position of the housing body 20 on the second end 204 side from the ear hooking part 26 (27) in the longitudinal direction D2.

As described above, the visible light communication terminal 1 can be used without being held by hand, since the housing body 20 thereof is fitted to the ear by the ear hooking part 26 (27) being hooked onto the auricle of the ear of the user. Furthermore, since the light receiving unit 11 is located in the portion, of the housing body 20, on the upper side in the vertical direction in the state where the housing body 20 is fitted to the auricle, the light receiving unit 11 can reliably receive light that is radiated from above.

Also, in the present embodiment, the components that are housed in the housing body 20 are arranged such that the center of gravity of the visible light communication terminal 1 is located vertically lower than a position of the one end with which the ear hooking part 26 (27) is attached to the housing body 20, in the state where the housing body 20 is fitted to the auricle.

That is to say, the components that are housed in the housing body 20 are arranged such that the center of gravity of the visible light communication terminal 1 is located inside the base part 20a.

That is to say, the components that are housed in the housing body 20 are arranged such that the center of gravity of the visible light communication terminal 1 is located on the first end 203 side in the longitudinal direction D2 from the position of the one end with which the ear hooking part 26 (27) is attached to the housing body 20.

By lowering the center of gravity, as described above, there is an effect that the position of the housing body 20 is stabilized due to the upper part of the housing body 20 less likely to move about compared with the case where the center of gravity is located above the position of the one end with which the ear hooking part 26 (27) is attached to the housing body 20.

Also, in the present embodiment, the output unit includes the loudspeaker 14 configured to convert the sound signal generated based on the information obtained from the visible light communication signal to sound and outputs the sound. The loudspeaker 14 is located vertically lower than the position of the one end with which the ear hooking part 26 (27) is attached to the housing body 20, in the state where the housing body 20 is fitted to the auricle.

That is to say, the output unit includes the loudspeaker 14 configured to convert the sound signal generated based on the information obtained from the visible light communication signal to sound and outputs the sound. Also, the loudspeaker 14 is located inside the housing body 20 such that at least a portion of the ear hooking part 26 (27) is located between the loudspeaker 14 and the light receiving unit 11 in the longitudinal direction D2.

As described above, the loudspeaker 14 that is relatively heavy is located vertically lower than the position of the one end with which the ear hooking part 26 (27) is attached to the housing body 20, in the state where the housing body 20 is fitted to the auricle. Accordingly, the center of gravity of the visible light communication terminal 1 can be lowered. Also, the loudspeaker 14 is located vertically lower than the position of the one end with which the ear hooking part 26, which is to be hooked to the auricle, is attached to the housing body 20. Accordingly, there is an effect that the loudspeaker 14 can be arranged near the ear canal, and the sound from the loudspeaker 14 can be easily heard.

Also, in the present embodiment, the first projecting part 21 projecting toward the auricle in the state where the housing body 20 is fitted to the auricle is provided on a portion of the housing body 20 where the loudspeaker 14 is housed, and the loudspeaker 14 is housed inside the first projecting part 21.

That is to say, the first projecting part 21 is provided on the housing body 20 on the base part 20a side thereof in the longitudinal direction D2 to project in the thickness direction D1, and the loudspeaker 14 is housed inside the first projecting part 21.

That is to say, the first projecting part 21 is provided on the housing body 20 on the first end 203 side thereof in the longitudinal direction D2 to project in the thickness direction D1, and the loudspeaker 14 is housed inside the first projecting part 21.

As described above, since the first projecting part 21 that houses the loudspeaker 14 projects toward the auricle, the portion of the housing body 20 other than the first projecting part 21 can be away from the head of the user. Accordingly, as a result of the housing body 20 being unlikely to abut against the head and hair, and thus the operation of fitting the housing body 20 to the ear is not hampered, and the housing body 20 can be easily fitted to the ear.

Also, in the present embodiment, the second projecting part 22 projecting is provided on a portion of the housing body 20 on the upper side of the housing body 20, so as to project toward the head of the user in the vertical direction in the state where the body is fitted to the auricle of the user, the portion being on an opposite side of the position of the one end with which the ear hooking part 26 (27) is attached to the housing body 20 from the loudspeaker 14.

That is to say, the second projecting part 22 is provided on the housing body 20 on the extension part 20b side thereof in the longitudinal direction D2 to project in the same direction as the projecting direction of the first projecting part 21.

That is to say, the second projecting part 22 is provided on the housing body 20 on the second end 204 side thereof in the longitudinal direction D2 to project in the same direction as the projecting direction of the first projecting part 21.

As described above, since the second projecting part 22 projecting toward the head is provided on the upper part of the housing body 20, the light receiving unit 11 or the like can be housed in the second projecting part 22. Also, since the thickness of the portion of the housing body 20 between the first projecting part 21 and the second projecting part 22 can be reduced, the housing body 20 can be made unlikely to abut against the head when the housing body 20 is fitted to the ear.

Also, in the present embodiment, the housing body 20 is provided, on left and right sides relative to a portion thereof that opposes an ear canal in the state where the housing body 20 is fitted to the auricle, with grooves (attachment parts) 25 (251) and 25 (252) to which the one end 261 (271) of the ear hooking part 26 (27) is detachably attached. The direction in which the ear hooking parts 26 and 27 are hooked onto the auricle is reversed depending on whether the ear hooking part 26 is attached to the groove 251 on the left or the ear hooking part 27 is attached to the groove 252 on the right. The ear hooking part 26 or 27 is attached to one of the groove 251 on the left and the groove 252 on the right.

That is to say, one of the ear hooking part 26 for fitting to right ear and the ear hooking part 27 for fitting to left ear is selected as the ear hooking part. The housing body 20 is provided, on the first surface 201, with the first attachment part 251 to which one end 261 of the ear hooking part 26 for fitting to right ear is detachably attached, and the second attachment part 252 to which one end 271 of the ear hooking part 27 for fitting to left ear is detachably attached.

Accordingly, the housing body 20 of the visible light communication terminal 1 can be attached to one of the right ear and the left ear, and the user can select which ear the visible light communication terminal 1 is fitted to.

Also, in the present embodiment, it is preferable that the expandable and retractable pole 28 configured to be adjustable in the projecting direction from the housing body 20 is provided in a portion, of the housing body 20, on the upper side in the vertical direction, in the state where the housing body 20 is fitted to the auricle. The light receiving unit 11 is arranged at a tip of the pole 28.

That is to say, it is also preferable that the expandable and retractable pole 28 configured to be adjustable in the projecting direction from the housing body 20 is provided on the extension part 20b of the housing body 20. The light receiving unit 11 is arranged at a tip of the pole 28.

That is to say, it is also preferable that the expandable and retractable pole 28 configured to be adjustable in the projecting direction from the housing body 20 is provided on the second end 204 side of the housing body 20 in the longitudinal direction D2. The light receiving unit 11 is arranged at a tip of the pole 28.

Since the pole 28 is adjustable in the projecting direction and expandable and retractable, light from a desired direction can be received at a desired position, by adjusting the projecting direction and the length of the pole 28.

The invention claimed is:

1. A visible light communication terminal comprising:
    a light receiving unit configured to receive a visible light communication signal that is outputted from an external visible light transmitter, and convert the received signal to an electrical signal;
    an output unit configured to output information obtained from the visible light communication signal that is converted to the electrical signal by the light receiving unit to the outside;
    a power supply unit configured to supply electric power to the light receiving unit and the output unit;
    a housing body that houses the light receiving unit, the output unit, and the power supply unit; and
    an ear hooking part curved in an arc-like shape and attached at one end thereof to the housing body, and configured to fit the housing body to an auricle of an ear by being hooked onto the auricle and together with the housing body sandwiching the auricle therebetween,
    the light receiving unit being located on a portion of the housing body on an upper side thereof in a vertical direction in a state where the housing body is fitted to the auricle,
    the output unit including a loudspeaker configured to convert a sound signal generated based on the information into sound and output the sound,
    the loudspeaker being located vertically lower than the position of the one end with which the ear hooking part is attached to the body, in the state where the housing body is fitted to the auricle,
    a first projecting part being provided on a portion of the housing body on the upper side of the housing body in the vertical direction, so as to project toward a head of a user in the state where the housing body is fitted to the auricle of the user, the portion being on an opposite side of the position of the one end with which the ear hooking part is attached to the housing body from the loudspeaker, and
    the light receiving unit being housed in the first projecting part.

2. The visible light communication terminal according to claim 1, wherein components that are housed in the housing body are arranged such that a center of gravity of the visible light communication terminal is located vertically lower than a position of the one end with which the ear hooking part is attached to the housing body, in the state where the housing body is fitted to the auricle.

3. The visible light communication terminal according to claim 1, wherein a second projecting part projecting toward the auricle in the state where the housing body is fitted to the auricle is provided on a portion of the housing body where the loudspeaker is housed, and the loudspeaker is housed inside the first second projecting part.

4. The visible light communication terminal according to claim 1, wherein
    the housing body is provided, on left and right sides relative to a portion thereof that opposes an ear canal in the state where the housing body is fitted to the auricle, with attachment parts to which the one end of the ear hooking part is detachably attached,
    a direction in which the ear hooking part is hooked onto the auricle is reversed depending on whether the ear hooking part is attached to the attachment part on the left or is attached to the attachment part on the right, and
    the ear hooking part is attached to one of the attachment part on the right and the attachment part on the left.

5. The visible light communication terminal according to claim 1, wherein
    an expandable and retractable pole configured to be adjustable in a projecting direction from the housing body is provided on a portion of the housing body on the upper side thereof in the vertical direction in the state where the housing body is fitted to the auricle, and
    the light receiving unit is arranged at a tip of the pole.

6. The visible light communication terminal according to claim 1, wherein
    the housing body has a first surface and a second surface on different sides in a thickness direction, and the ear hooking part is attached to the housing body such that a predetermined gap for sandwiching the auricle is formed between the ear hooking part and the first surface,
    the housing body includes a base part to which the ear hooking part is attached and an extension part extending from the base part, on a first side and a second side in a longitudinal direction that is orthogonal to the thickness direction,
    the ear hooking part is attached to the base part so as to project convexly in the longitudinal direction from the base part side toward the extension part side, and
    the light receiving unit is arranged on the extension part of the housing body.

7. The visible light communication terminal according to claim 6, wherein components that are housed in the housing body are arranged such that a center of gravity of the visible light communication terminal is located inside the base part.

8. The visible light communication terminal according to claim 6, wherein
    the loudspeaker is located inside the housing body such that at least a portion of the ear hooking part is located between the loudspeaker and the light receiving unit in the longitudinal direction.

9. The visible light communication terminal according to claim 8, wherein a second projecting part is provided on the housing body on the base part side thereof in the longitudinal direction to project in the thickness direction, and the loudspeaker is housed inside the second projecting part.

10. The visible light communication terminal according to claim 9, wherein the first projecting part is provided on the housing body on the extension part side thereof in the longitudinal direction to project in a same direction as the projecting direction of the second projecting part.

11. The visible light communication terminal according to claim 6, wherein
one of an ear hooking part for fitting to right ear and an ear hooking part for fitting to left ear is selected as the ear hooking part, and
the housing body is provided, on the first surface thereof, with a first attachment part to which one end of the ear hooking part for fitting to right ear is detachably attached, and a second attachment part to which one end of the ear hooking part for fitting to left ear is detachably attached.

12. The visible light communication terminal according to claim 6, wherein
on the extension part of the housing body, an expandable and retractable pole configured to be adjustable in a projecting direction from the housing body is provided, and
the light receiving unit is arranged at a tip of the pole.

\* \* \* \* \*